United States Patent [19]
Cook, Jr.

[11] 3,884,591
[45] May 20, 1975

[54] AUTOMATIC HYDRAULIC TOOL SLIDE CAM ASSIST FOR A MACHINE TOOL

[75] Inventor: Francis W. Cook, Jr., Newington, Conn.

[73] Assignee: Litton Industrial Products, Inc., New Britain, Conn.

[22] Filed: Sept. 17, 1973

[21] Appl. No.: 397,716

[52] U.S. Cl. ............... 408/11; 82/14 A; 82/21 A; 173/160; 91/378; 408/130
[51] Int. Cl. ............................................. B23b 47/22
[58] Field of Search ......... 408/10, 11, 12, 130, 129; 82/21 A, 14 A, 21 R; 91/378; 173/4, 160; 29/43, 44

[56] References Cited
UNITED STATES PATENTS

| | | | |
|---|---|---|---|
| 1,173,574 | 2/1916 | Hayden | 408/71 X |
| 3,404,601 | 10/1968 | Onsrud | 408/11 X |

Primary Examiner—Andrew R. Juhasz
Assistant Examiner—Z. R. Bilinsky
Attorney, Agent, or Firm—Joseph R. Spalla

[57] ABSTRACT

Machine tools such as boring machines have been provided with slide assemblies in the prior art which have been controlled by a cam and cam follower having the advantage of positive mechanical control of the slide. Such apparatus has experienced high wear problems at the cam follower and cam interface. The invention provides a hydraulic assist in combination with the conventional cam follower which in response to forces transmitted by the cam follower mechanism provides a fluid assistance to urge the follower in the desired direction.

9 Claims, 2 Drawing Figures

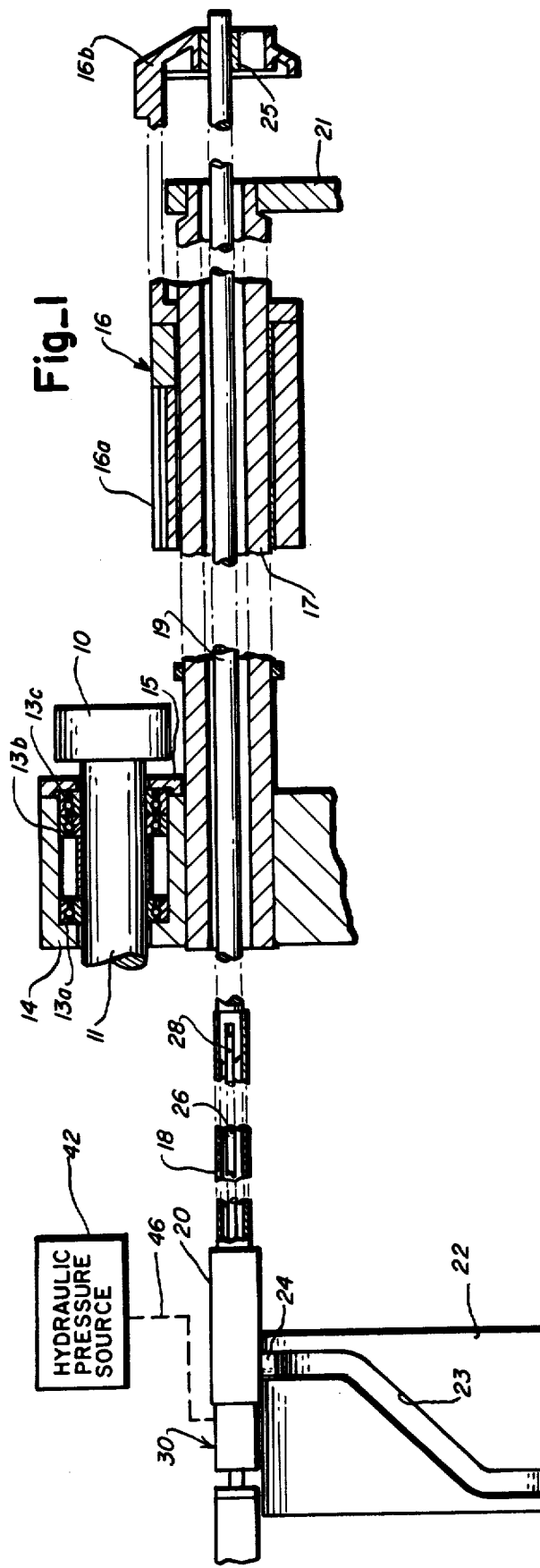
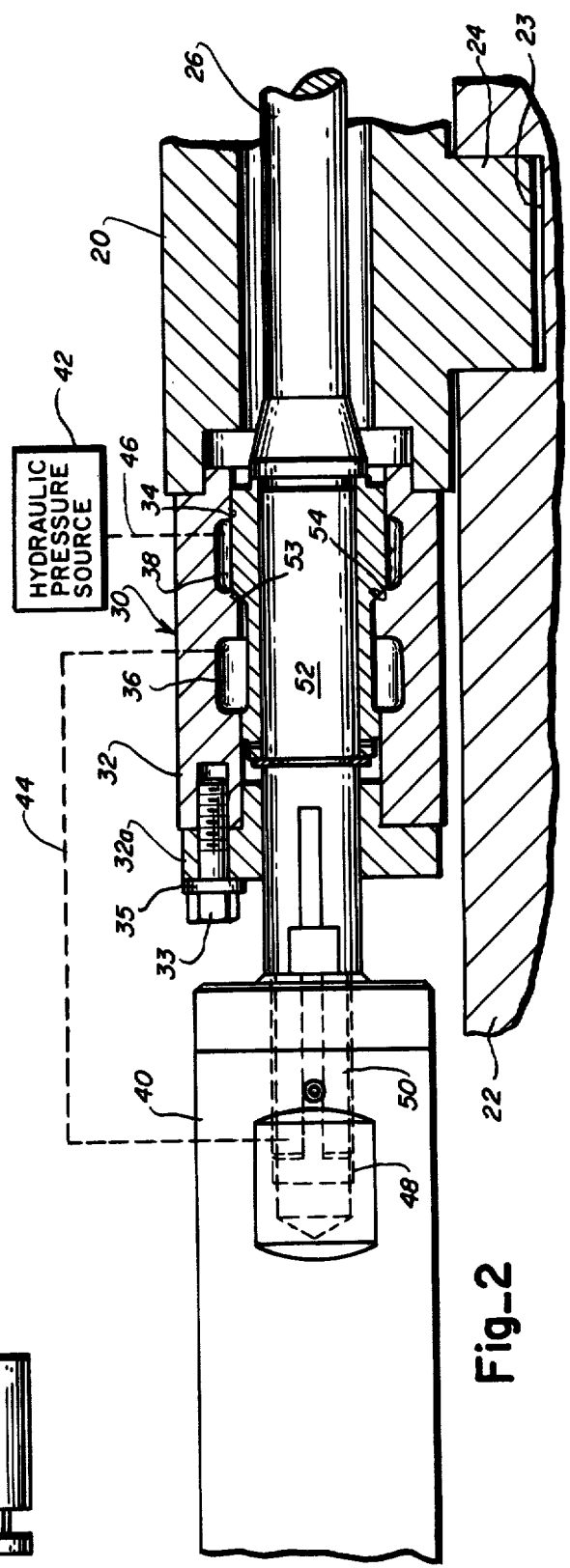

3,884,591

AUTOMATIC HYDRAULIC TOOL SLIDE CAM ASSIST FOR A MACHINE TOOL

BACKGROUND OF THE INVENTION

It is well known in machines tools to provide a reciprocably mounted slide assembly. In one form of boring machine, multiple spindles are disposed proximate a slide for rotating a plurality of workpieces. Carried on the slide may be a plurality of cutting tools such as drills or other cutting elements disposed for engagement with the rotating workpieces. Conventional mechanism for advancing the slide toward the workpiece includes a cam having a generally cylindrical contour and a groove circumferentially disposed thereon and extending between different axial positions. The groove will, very generally, be contoured like a helix. Rotation of the cam causes the cam follower to move in a direction parallel to the axis of the cam, and, through a mechanical linkage to the slide, urge the slide either toward or away from the rotating workpiece. It will be understood that the machine tools need not necessarily be structured in this manner but may also have a stationary workpiece with a rotating tool. Machine tools of the general type include but are not limited to boring machines, drill presses and pipe threading machines.

A major problem with such apparatus has been a very substantial amount of wear on the cam slot, particularly on one side thereof which must necessarily absorb the forces necessary to urge the workpieces and tools together. Ordinarily, the forces to separate the workpieces and the tools are relatively minor as compared to the forces required to urge the workpieces and the tools together. The positive mechanical control is particularly desirable because absent this control there could be erratic movement of the slide in some operating modes, such as in the case where several of a group of drills break through their respective workpieces. Erratic movement is, of course, even more objectionable in machining a blind hole or planar surface as opposed to a through hole. The mechanical cam and follower has been found to be essential to this control. The desirability of this positive mechanical linkage has inhibited the choice of various hydraulic assistance mechanisms in the past since the selection of those mechanisms best known would eliminate the positive mechanical control as well as present synchronization problems therebetween.

The prior art includes apparatus as disclosed in Webb, U.S. Pat. No. 2,551,517, issued May 1, 1951, which shows apparatus having a very general similarity to that of the instant invention. More particularly, the apparatus therein utilizes a cam having a groove on the face thereof in the manner described above together with a cam follower to urge a chucked pipe into engagement with a pipe threading apparatus. The inventor therein recognized the wear problem on the groove and provided a fluid pressure cylinder to urge the thread chasers toward the workpiece. The apparatus utilized the positive mechanical cam follower for a quick approach to the workpiece and thereafter, the movement of the chuck and the workpiece is effected by a fluid pressure cylinder. A separate ring is provided on the cam to independently direct fluid pressure to assist in the relative movement of the workpiece and the thread chasers. Such apparatus is representative of that type which is known but which because of the synchronization problems between the mechanical linkage and the fluid power assist may result either in damage to the apparatus or continued wearing of the cam slot.

SUMMARY OF THE INVENTION

It has now been found that the problems associated with the prior art apparatus may be avoided in any machine tool having workpiece holding means and tool holding means in conjunction with a slide carrying one of the holding means and wherein the slide is mounted for reciprocating rectilinear motion between a point proximate the other of the holding means at a point distal of the other of the holding means and further including cam means for controlling movement of the slide between such proximate and distal positions. The combination includes a cam follower means responsive to the movement of the cam and operatively connected to the slide to urge the slide between the proximate and distal positions and includes means responsive to forces urging the slide toward the proximate position to assist the cam moving the slide towards that position. Normally, such apparatus will include fluid pressure supply means in fluid communication with valving means which will open increasingly in response to increasing force in the cam follower means tending to urge the slide toward the proximate position. The valving means is disposed in fluid communication with a piston and cylinder means which are coupled to the slide to urge the slide towards the proximate position in response to fluid pressure passed by the valving means.

In one embodiment, the fluid pressure supply means will be hydraulic and the valving will comprise a slide valve having lands therein and the means responsive to forces urging the slide toward the proximate position will include a concentrically disposed tube and shaft assembly. The tube may have one end fixedly connected to the slide and one end of the shaft. The other end of the shaft will be fixedly connected to the slide valve.

It has been found that the present invention meets the objects thereof which include providing a machine tool slide control apparatus which is capable of absolute mechanical control without cam and cam follower wear which is common in the prior art structures.

Another object of the invention is to provide apparatus which is simple to operate and which may be manufactured and assembled simply and inexpensively.

BRIEF DESCRIPTION OF THE DRAWING

FIG. 1 is a simplified broken-away side elevation view in partial section and to a reduced scale of the apparatus in accordance with the present invention; and FIG. 2 is a broken-away side elevational view of a portion of the apparatus shown in FIG. 1.

DETAILED DESCRIPTION OF THE PREFERRED EMBODIMENT

Turning now in detail to FIGS. 1 and 2 of the attached drawing, there is illustrated a simplified boring machine. A workpiece (now shown) is carried by a chuck 10 which is rotated by means of a spindle 11 which is carried by bearings 13a, 13b, 13c within a frame or housing 14. The bearings 13b and 13c are secured by a retainer 15. Drive means (now shown) are provided to rotate the spindle 11. Shown in the Figure disposed proximate to the chuck 10 is the slide assembly or slide generally designated by the numeral 16 having a generally planar surface 16a disposed at right angles to the plane of the section shown. The generally planar surface 16a shown is uppermost and include a T-slot in the conventional manner for fastening tools therefor which are intended to machine the workpiece held by the chuck 10. It will be understood that in such machines, more than one spindle 11 will ordinarily be provided together with corresponding chucks 10 although only one is shown. In machines with multiple spindles, corresponding generally planar surfaces 16a are provided at angularly disposed spindle stations. While the invention is shown in the context of a boring machine, and it will be understood to those skilled in the art, that it has application to other machine tools as well in which a reciprocating slide is utilized.

The slide 16 extends completely around a stem 17 and a drawbar 19. The stem 17 which supports the slide 16 is supported by the housing 14 and a bushing assembly 21 which is in turn carried by the housing (not shown) of the machine.

The slide 16 is urged to the position shown by means of a tube 18 which is fixed to the drawbar 19 at the right end (as viewed) of the tube 18. On the opposite end of the tube 18 is fixed a cam follower assembly 20. The cam follower assembly 20 includes cam roll 24 which engages a rotatably mounted cam 22 carried by supporting structure (not shown) for rotational movement about an axis generally parallel to the axis of the tube 18. A cam slot 23 is provided therein having an overall generally helical form whereby upon rotation of cam 22 the tube and associated slide are urged to the leftmost position from the right-most or distal position shown in the Figure. The right end of drawbar 19 is fixed to an adjusting nut 25 which is fixed to the slide extension 16b.

In accordance with the invention, a shaft 26 is provided which is disposed in concentric relationship to the tube 18 with which it is fixed at the right-hand end as viewed by means of a pin 28 so that no relative motion occurs between the tube 18 and the shaft 26 at the right end. The diameter of the shaft 26 is substantially less than the diameter of the drawbar 19. Accordingly, the shaft 26 will elongate under load to a substantially greater degree. The load that is greatest occurs when the slide 16 is being urged to the left into engagement with a cutting tool.

At the opposite end of shaft 26 is provided a servo valve or slide valve generally designated by the numeral 30 having a body 32 fixed to the tube 18. The body 32 thereof has an end cap 32a secured by bolts 33 (one shown) and washers 35 (one shown) and an internally generally cylindrical bore 34. Defined within the bore are cavities 36 and 38 which are respectively in fluid communication with a hydraulic cylinder identified by the numeral 40 and a hydraulic pressure source 42. The connections thereto are respectively lines 44 and 46. The cylinder 40 is fixed by structure (not shown) to the housing 14 and has carried within it a piston 48 which is fixed through a connecting rod 50 directly to the spool 52 of the servo valve 30. The spool 52 of the servo valve is provided with a land 53 designed for cooperative engagement with a land 54 of the bore 34 of valve 30.

In operation, as cam 22 is rotated by drive means (not shown) to the position shown the tube 18 and shaft 26 are urged to the right. The movement to the right is purely a mechanical movement and no significant wear occurs at the interface between cam follower 20 and a cam slot 24 because the forces involved are relatively small. The forces are, of course, small because the tools which may be positioned on the slide 16 are merely being withdrawn from a workpiece held within one or more chucks 10. No hydraulic pressure is transmitted to the cylinder 40 since the urging of the tube 18 to the right as viewed places the tube in compression and more positively seats land 53 against land 54 since there is concurrent movement of the housing 32 of the servo valve 30 to the right.

When moving from the right-most position shown to the left wherein the slide will be proximate the chuck 10, a tension load will be imposed on tube 18 as a result of the predetermined forces resulting from urging the tool into engagement with the workpiece or workpieces. Because the shaft 26 is fixed only to the rightmost end of tube 18, and is not fixed to the tube 18 at any other points, the tension loads are not seen by the shaft 26. Relative elongation of the tube 18 with respect to the shaft 26 causes relative movement of the housing 32 of the servo valve 30 with respect to the spool 52 of the servo valve 30. The spool 52 is, of course, fixed to the left end of the shaft 26 and will remain fixed a finite distance from the right-hand end of tube 18 to which the shaft 26 is fixed. The relative movement between shaft 26 and tube 18 will cause the lands 54 and 53, respectively, of the housing 32 and spool 52 of the valve 30 to unseat and thereby place in fluid communication the hydraulic pressure source 42 and the cylinder 40. The amount of unseating will be a function of the stress placed on tube 18. The flow of hydraulic fluid past lands 53 and 54 will place the shaft under tension and the elongation thereof will urge the shaft 26 to the left as viewed and cause the seating of lands 53 and 54. The flow through these lands will be modulated accordingly by selection of the various components to maintain the forces within tube 18 at some predetermined maximum which will limit the maximum forces at the interface of cam 22 and cam follower 20.

As will be appreciated, the design of the apparatus may vary somewhat from the form illustrated herein and the invention is applicable to various machine tools having a slide mounting for holding either the workpiece or the tools. It will be seen that the present invention provides a novel apparatus for controlling the slide which will limit the wear on the cam and cam follower interface and which is simple and inexpensive to manufacture.

What I claim is:

1. In a machine tool for machining a plurality of workpieces associated therewith, the apparatus which comprises:
   a. workpiece holding means and tool holding means;
   b. a slide carrying one of said holding means, said slide being mounted for reciprocating rectilinear motion between a point proximate the other of said holding means and a point distal the other of said holding means;
   c. cam means for controlling movement of said slide between said proximate and said distal position;
   d. cam follower means responsive to the movement of said cam and operatively connected to said slide to urge said slide between said proximate and distal positions; and
   e. means responsive to predetermined forces developed when the tool is in engagement with the workpiece urging said slide toward said proximate position to assist said cam in moving said slide toward said proximate position.

2. The apparatus as described in claim 1, wherein said means responsive to forces urging said slide towards said proximate position comprises:
 a. fluid pressure supply means;
 b. valving means in fluid communication with said fluid pressure supply means, said valving means opening increasingly in response to increasing force in said cam follower means tending to urge said slide toward said proximate position;
 c. piston and cylinder means in fluid communication with said valving means, said piston and cylinder means coupled to said slide and urging said slide toward said proximate position in response to fluid pressure.

3. The apparatus as described in claim 2, wherein said fluid pressure supply means is hydraulic.

4. The apparatus as described in claim 3, wherein said valving means comprises a slide valve having lands therein.

5. The apparatus as described in claim 4, wherein said means responsive to forces urging said slide toward said proximate position further include a concentrically disposed tube and shaft, said tube having one end fixedly connected to said slide, said shaft being fixedly connected to said slide valve and having the opposite end thereof fixed to said one end of said tube.

6. In a machine tool of the type having workpiece holding means, tool holding means, a slide carrying one of said holding means, said slide being mounted for reciprocating linear motion so as to move the tool and workpiece relative to each other, and cam means for moving the tool and workpiece relative to each other, the improvement comprising:
 means responsive to predetermined tension forces resulting from moving the tool into engagement with the workpiece to provide a force to assist the cam means in moving the tool and workpiece together.

7. The improvement of claim 6, further comprising means responsive to second predetermined tension forces resulting from both moving the tool and workpiece closer together and from assisting the cam in moving the tool and workpiece closer together for terminating said assisting force.

8. The improvement of claim 7 wherein said means providing a force assisting said cam means comprises:
 a shaft connected to said cam means;
 a source of hydraulic pressure;
 valve means connected with said source responsive to the first predetermined tension forces resulting from moving the tool and workpiece closer together to allow the passage of said hydraulic pressure;
 piston means hydraulically connected to said valve means and connected to said shaft to transmit the force of said hydraulic pressure to provide a force to assist said cam means.

9. The improvement of claim 8 wherein said valve means is further responsive to the second predetermined tension forces resulting from both moving the tool and workpiece closer together and the force assisting the cam means, to terminate said assisting forces.

* * * * *